United States Patent [19]
Sebestyen

[11] Patent Number: 5,847,752
[45] Date of Patent: Dec. 8, 1998

[54] METHOD FOR CALL SETUP AND CONTROL OF VIDEOTELEPHONE COMMUNICATION

[75] Inventor: Istvan Sebestyen, München, Germany

[73] Assignee: Siemens Aktiengesellschaft, Munich, Germany

[21] Appl. No.: 776,340

[22] Filed: Jan. 24, 1997

[30] Foreign Application Priority Data

Jul. 25, 1994 [DE] Germany .......................... 44 26 253.1

[51] Int. Cl.[6] ........................... H04N 7/12; H04M 11/00
[52] U.S. Cl. ........................................ 348/17; 379/93.32
[58] Field of Search .................... 348/14–19; 379/93.01, 379/93.05–93.08, 93.14, 93.17, 93.26, 93.28–93.32, 93.34

[56] References Cited

FOREIGN PATENT DOCUMENTS 0 535 890 A2   7/1993   European Pat. Off. .
WO 93/18607    9/1993   WIPO .

OTHER PUBLICATIONS

NTZ Nachrichten Technische Zeitschrift, vol. 44, No. 12, Dec. (1991), R. Hinz, Kommunikationsprotokoll Für Bildtelefon–Endeinrichtungen, pp. 880–883.
Funkschau, vol. 65, No. 25, 26 Nov. 1993, von Gerhard, Kafka, Datenexpress Mit Guten Aussichten, pp. 126–130.
The Computer Journal, vol. 36, No. 1, (1993), I. Wakeman, Packetized Video–Options for Interaction Between the User, the Network and the Codec, pp. 55–67.
AT&T Technical Journal, vol. 72, No. 1, (1993), Scott H. Early et al, The Video Phone 2500–Video Telephony on the Public Switched Telephone Network, pp. 22–32.

*Primary Examiner*—Wing F. Chan
*Attorney, Agent, or Firm*—Hill & Simpson

[57] ABSTRACT

A method and arrangement for connection setup and control of digitally compressed audio, video and data signals between videotelephones of the analog and digital communication networks (for example, telephone network, mobile telecommunication) and a method and arrangement for the transmission of still pictures and/or between videotelephones of the same category are disclosed. In videotelephony, a bidirectional full-duplex information exchange is fundamentally assumed in both directions, that is, both communicating videotelephone terminal equipment are usually transmitter and receiver of audio, video, control and, potentially, other information types at the same time. The method for connection setup between videotelephone communication terminal equipment in a transmission network using a protected transmission protocol in a framework of ITU-T V.8 initialization and of an ITU-T V.34 modem, has the steps of: supporting videotelephone communication within the framework of the ITU-T V.8 initialization in that at least a request for high transmission quality for videotelephone communication is signaled to the network during connection setup between a calling terminal equipment and a called terminal equipment; and recognizing in the calling terminal equipment a type of the called terminal equipment and a type of the transmission network connected thereto.

7 Claims, 5 Drawing Sheets

TABLE 3/V.8
The "Call Function" Category

| start | b0 | b1 | b2 | b3 | b4 | b5 | b6 | b7 | stop | Octet-'callf0' |
|---|---|---|---|---|---|---|---|---|---|---|
| 0 | 1 | 0 | 0 | 0 | | | | | | Bits b0-b3 identify the "call function" category |
| | | | | | 0 | | | | | identifies a "tagged category octet" |
| | | | | | | 0 | 0 | 0 | | To be defined by the ITU-T (Voice memory telephone serve) |
| | | | | | | 1 | 0 | 0 | | To be defined by the ITU-T (Voice memory telephone) |
| | | | | | | 0 | 1 | 0 | | "Text phone" according to ITU-T V.18 |
| | | | | | | 1 | 1 | 0 | | To be defined by the ITU-T |
| | | | | | | 0 | 0 | 1 | | To be defined by the ITU-T |
| | | | | | | 1 | 0 | 1 | | To be defined by the ITU-T |
| | | | | | | 0 | 1 | 1 | | Sending and receiving data |
| | | | | | | 1 | 1 | 1 | | "Call function" identified as expansion octet 'callf1' |
| | | | | | | | | | 1 | Stop bit |

FIG. 4

TABLE 4/V.8
Modulation mode

| start | b0 | b1 | b2 | b3 | b4 | b5 | b6 | b7 | stop | Octet-'modn0' |
|---|---|---|---|---|---|---|---|---|---|---|
| 0 | | | | | | | | | | Bits b0-b3 identify the modulation mode category |
| | 1 | 0 | 1 | 0 | | | | | | identifies a "tagged category octet" |
| | | | | | 0 | | | | | Reserved for future ITU-T applications |
| | | | | | | 0 | | | | |
| | | | | | | | x | | | 1 indicates V.34 duplex mode present |
| | | | | | | | | x | | 1 indicates V.34 half-duplex mode present |
| | | | | | | | | | 1 | Stop bit |

FIG. 5

TABLE 5/V.8
Coding for the protocol category

| start | b0 | b1 | b2 | b3 | b4 | b5 | b6 | b7 | stop | Octet-'prot0' |
|---|---|---|---|---|---|---|---|---|---|---|
| 0 | 0 | 1 | 0 | 1 | | | | | | Bits b0-b3 identify the protocol category |
| | | | | | 0 | | | | | identifies a "tagged category octet" |
| | | | | | | 1 | 0 | 0 | | Call for LAPM protocol according to ITU-T V.42 |
| | | | | | | 1 | 0 | 1 | | Call for LAP "Voice memory telephone" Protocol for PSTN |
| | | | | | | 1 | 1 | 0 | | Call for LAP "Voice memory telephone" Protocol for mobile networks |
| | | | | | | 1 | 1 | 1 | | Calls for protocols identified as expansion octet |
| | | | | | | | | | 1 | Stop bit |

METHOD FOR CALL SETUP AND CONTROL OF VIDEOTELEPHONE COMMUNICATION

BACKGROUND OF THE INVENTION

The invention is directed to a method for call setup and a method for controlling digitally compressed audio, video and data signals between videotelephone terminal equipment via analog and/or digital communication networks, as well as a method for optional transmission of still pictures, datafiles, camera as well as cursor remote control information between videotelephone terminal equipment.

Videotelephone connectible via analog interfaces to an analog or to a digital communication network are used for the simultaneous transmission of digitally encoded audio, video and data signals. An analog network in this sense is, for example, the analog telephone network, which shall also be referred to as PSTN (Public Switched Telephone Network) below. The digital mobile radiotelephone network GSM (Global Standard for Mobile Communications) can be cited as an example of a digital communication network. After a call setup between two videotelephone terminal equipment, the acoustic source signals are converted into analog electrical oscillations by a microphone of the transmitting apparatus, these being digitally encoded, compressed and transmitted to the receiving videotelephone terminal equipment via the analog telephone network isochronically with the video information. In the receiving videotelephone terminal equipment, the received, digitally compressed voice signals are decompressed and converted into analog electrical signals that are isochronically converted into acoustic signals and output. At the same time, the analog motion pictures of the transmitting apparatus registered by a camera are likewise digitally encoded, compressed and transmitted to the receiving videotelephone terminal equipment via the analog telephone network isochronically with the audio information. In the receiving videotelephone terminal equipment, the received, digitally compressed video signals are decompressed and converted into analog electrical signals that are isochronically output in the receiving videotelephone terminal equipment as moving pictures. A bidirectional, full-duplex information exchange in both directions is fundamentally assumed in videotelephony, i.e. both communicating videotelephone terminal equipment can be transmitter and receiver of audio, video, control and, potentially, other types of information at the same time.

In particular, still pictures and computer datafiles can be simultaneously transmitted from the transmitting to the receiving videotelephone terminal equipment as additional options. Still picture transmission is assigned a special role in case the line quality of the network only allows a low overall transmission rate (for example, below 8 kbit/s) that no longer assures the required minimum quality of moving pictures.

SUMMARY OF THE INVENTION

An object of the invention is to offer a method and an arrangement for reliable, simply realized communication between videotelephone terminal equipment regardless of whether the communication terminal equipment are connected to the respective communication network via analog or digital interfaces.

In general terms the present invention is a method for connection setup between videotelephone communication terminal equipment using a protected transmission protocol in the framework of the ITU-T V.8 initialization and of an ITU-T V.34 modem. The videotelephone communication is supported within the framework of the ITU-T V.8 initialization in that, among other things, the request for a high transmission quality for the videotelephone communication is still signalled to the network during the connection setup. The calling terminal equipment recognizes the type of the called terminal equipment and the type of the transmission network connected thereto.

The present invention is also a method for the control of videotelephone communication between videotelephone communication terminal equipment in a virtual control channel within the framework of an ITU-T V.34 information transfer. A virtual control channel with HDLC LAP protected transmission of the control data blocks in bidirectional full-duplex mode with the control instructions is set forth in the following Table:

| Control instruction | Function | Action time | Number of actions | Control reactions |
|---|---|---|---|---|
| GEREIG (prescribed) | Exchange of device properties; GEREIG is simultaneously sent by both parties | Immediately after setup of the virtual control channel | Once | ACKNOW or NOTACK with potentially following SENDPAR |
| EMPFPAR (optional) | Parameters of the desired reception preferences. Can be independently requested by one or both parties. | After exchange of the GEREIG | Arbitrary | ACKNOW or NOTACK |
| SENDPAR (prescribed) | Setting the transmission parameters on the basis of received GEREIG and EMPFPAR | Immediately after reception and acknow-ledge of GEREIS of the other party | At least once | ACKNOW or NOTACK |
| SENDSTD (optional) | Send still picture. Image datafile and image parameters embedded in ITU-T T.84 / ISO/IEC 10918-3 data stream | Any time if the option is permitted at the receiver (GEREIS) | Arbitrary | ACKNOW or NOTACK |
| ABRSTD (optional) | Fetch still picture. Image datafile and image parameters embedded in ITU-T T.84 / ISO/IEC 10918-3 data stream | Any time if the option is permitted at the transmitter and receiver | Arbitrary | ACKNOW or NOTACK |

-continued

| Control instruction | Function | Action point in time | Number of actions | Control reactions |
|---|---|---|---|---|
| SENDDAT (optional) | Send datafile. Datafile and datafile parameters embedded in ITU-T T.434 data stream | Any time if the option is permitted at the receiver (GEREIS) | Arbitrary | ACKNOW or NOTACK |
| ABRDAT (optional) | Fetch datafile. Datafile and datafile parameters embedded in ITU-T T.434 data stream | Any time if the option is permitted at the transmitter and receiver | Arbitrary | ACKNOW or NOTACK |
| CAMSTR (optional) | Remote control (pan, zoom, etc.) of the camera of the other party | Any time if the option is available at the transmitter and permitted at the receiver (GEREIS, EMPFPAR) | Arbitrary | ACKNOW NOTACK |
| CURSSTR (optional) | Cursor remote control. Moving a cursor in the image surface of the other party | Any time if the option is available at the transmitter and permitted at the receiver (GEREIS, EMPFPAR) | Arbitrary | ACKNOW or NOTACK |
| EXIT (prescribed) | Proper termination of the communication | Can be initiated from both sides | Once | ACKNOW or NOTACK |
| ABORT (prescribed) | Abort in case of error -- end of the communication | Can be initiated from both sides | Once | ACKNOW or NOTACK |

| Control instruction | Function | Action point in time | Number of actions | Control reactions |
|---|---|---|---|---|
| ABORT with RESET (prescribed) | Abort in case of error -- maintain the communication, reset all default parameters | Can be initiated from both sides | Arbitrary | ACKNOW or NOTACK with subsequent GEREIG |
| ACKNOW (prescribed) | Positive acknowledgment of a control instruction | Control receiver | Once | None |
| NOTACK (prescribed) | Negative acknowledgment of a control instruction | Control receiver | Arbitrary | New control instruction |

Advantageous developments of the present invention are as follows.

For controlling different information types, a "virtual" channel is allocated to each of the information types using the HDLC LAP method and either fixed or freely definable transmission priorities and/or error correction priorities are allocated to the various data types. Preset normal parameters are employed at the beginning of the communication instead of freely definable priorities. This normal parameters are capable of being redefined during the course of the communication using the control instructions EMPFPAR and SENDPAR.

Image datafiles are embedded in ITU-T T.84/ISO/IEC 10918-3 datafile formats. The parameters of the image datafiles are embedded in the ITU-T T.84/ISO/IEC 10918-3. Continuous color images according to ITU-T T.81/ISO/IEC 10918-1 ("JPEG") with variable image size with sequential or progressive image construction are supported. "Icons" of the continuous color images according to ITU-T T.81/ISO/IEC 10918-1 ("JPEG") with variable image size are supported. Bilevel (for example, black/white) images according to ITU-T T.82/ISO/IEC ii544 ("JBIG") with variable image size with sequential or progressive image construction are supported. Preparations for transmission are negotiated and set with the control instructions GEREIG, EMPFAR and SENDPAR. The control of the still picture transmission ensues with the control instructions SENDSTD and ABRSTD, and their reception is acknowledged with ACKNOW or negatively acknowledged with NOTACK in case of error.

Arbitrary program or data datafiles are defined according to ITU-T T.434. Preparation for transmission are negotiated and set with the control instructions GEREIG, EMPFAR and SENDPAR. The control of the datafile transmission ensues with the control instructions SENDDAT and ABRDAT, and their reception is acknowledged with ACKNOW or is negatively acknowledged with NOTACK in case of error.

With a remote control of a camera preparation for transmission are negotiated and set with the control instructions GEREIG, EMPFAR and SENDPAR. The control of the datafile transmission ensues with the control instructions CAMSTR, and their reception is acknowledged with ACKNOW or is negatively acknowledged with NOTACK in case of error.

Remote control of a cursor ensues with the control instructions CURSSTR, and their reception is acknowledged with ACKNOW or is negatively acknowledged with NOTACK in case of error. Preparation for transmission is negotiated and set with the control instructions GEREIG, EMPFAR and SENDPAR.

These components of the present invention contain:
  call setup
  control of the communication
  transmission of still picture
  transmission of datafiles (file transfer)
  optional transmission of the camera remote control command
  optional transmission of the cursor (pointer) remote control command.

A bidirectional, full-duplex information exchange in both directions is fundamentally assumed given employment of the inventive method.

Dependent on the individual forms of realization and special characteristics, the invention is based on the following information technology and/or communication technology standards:

The norming of voice encoders with very low bit rates current in the ITU-T, for example for videotelephony in the public switched telephone network, leads to qualitatively good voice encoders (approximately the quality of CCITT G.726 Recommendation) with transmission rate of 4–8 kbit/s.

The norming of moving picture encoders current in the ITU-T and ISO/IEC with very low bit rates, for example for videotelephony in the public switched telephone network (Draft ITU-T H.26P), leads to qualitatively usable moving picture encoders with the expedient transmission rate of 8–24 kbit/s.

The norming of still pictures with continuous gray scale values or colors concluded in the ITU-T and ISO/IEC (ITU-T T.81/ISO/IEC 10918-1) with very low bit rates, for example for videotelephony in the public switched telephone network with the expedient transmission rate of 4–24 kbit/s.

The norming of two-color still pictures concluded in the ITU-T and ISO/IEC (ITU-T T.82 I ISO/IEC 11544) with very low bit rate, for example for videotelephony in the public switched telephone network with the expedient transmission rate of 2–24 kbit/s.

The ongoing standardization in the ITU-T and ISO/IEC of the datafile exchange format ITU-T T.84/ISO/IEC 10918-3 ("Extensions") for video communication. The still picture compression algorithms ITU-T T.81/ISO/IEC 10918-1 ("JPEG"—for continuous color images) and ITU-T T.82/ISO/IEC 11544 ("JBIG"—for bi-level still pictures) are supported.

The current norming in the ITU-T of multiplexing of audio-visual data types with very low bit rate, for example for videotelephony in the public switched telephone network with transmission rate of 9.6–32 kbit/s.

The norming of the high-speed modem ITU-T V.34 passed in the ITU-T that enables the transmission rate of 2.4–28.8 kbit/s in the public switched telephone network dependent on the line quality.

The norming of the modem initialization standard ITU-T V.8 passed in the ITU-T that offers the basis of an initialization procedure that is also suitable for videotelephony if it is expanded with functionalities and code points for videotelephony.

The norming of the datafile description passed in the ITU-T in the ITU-T T.434 "Binary file transfer for the telematic services".

The advantages of inventive methods are described below:

In the call setup:

The PSTN videotelephones currently offered in the marketplace make use of slower modems—belonging in the family of the ITU-T V.32. These modems only allow transmission speeds that permit a lower quality of audio and video pictures as well as for still and moving pictures. An advantage of the ITU-T V.32 modem solution is the possibility of initially beginning the communication between two videotelephone terminal equipment as normal voice telephone communication—as desired by the videotelephone service—and adding the video communication as needed. This, however, is not directly possible given employment of the high-speed modem ITU-T V.34 that enables a significantly better audio and video quality. An inventive method also enables the above-desired functionality given employment of the ITU-T V.34 modem and of the ITU-T V.8 initialization pertaining thereto.

In the control of the communication:

The current standardization of the multiplexing of data types (audio, video, data and control information) provides the independent transmission of virtual channels within a LAP-x method (Link Access Protocol) method to be developed. A separate, protected virtual channel with high transmission priority should thereby be allocated to control information types. This is achieved with a version of the already known HDLC-LAP method. An inventive method should enable the control of the videotelephone communication.

In the transmission of still pictures:

The videotelephones currently available in the marketplace only offer the transmission of still pictures in the simplest form. A "frozen" moving picture is either offered with its physical dimension or with doubled resolution. An inventive method should enable the definition and control of the optional still pictures significantly more versatilely in videotelephone communication. Still pictures of different natures (for example, black/white and color pictures) and flexible image resolution size and still pictures with sequential image construction (line-by-line or block-by-block) and/or with progressive image construction (an image with coarser image quality is transmitted first, but fast; the image quality is improved step-by-step as the transmission continues). Miniature images (so-called icons) are likewise supported. Despite low data rates, progressive image construction—a particular advantage of the inventive method—allows complicated still pictures to be encoded, transmitted and decoded with minimum delay in real time, whereby the image quality of the decoded image improves step-by-step up to the maximum image quality.

In the transmission of datafiles:

An inventive method optionally enables a datafile exchange between transmitting and receiving videotelephone terminal equipment (file transfer with the assistance of ITU-T T.434).

In the transmission of camera remote control instructions:

An inventive method describes an optional remote control of the camera of the communicating partner. This serves for the support of certain applications such as, for example, traffic monitoring.

In the transmission of cursor remote control instructions:

An inventive method describes an optional remote control of a cursor (pointer) on the picture screen of the communicating partner. This serves for the support of visual communication.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Preferably, the following elements of information technology and/or telecommunications that have been standardized or are to be standardized in future are employed:

Modem ITU-T V.34 with a higher transmission rate (up to 28000–32000 bits/s) and the initialization procedure according to ITU-T V.8 belonging thereto.

An expansion of the ITU-T V.8 Recommendation needed for the recited applications.

The reliable and error-resistant transmission of information blocks (an HDLC-LAP-conforming packet-switched transmission protocol) of the draft "ITU-T H.24P".

The current standardization of voice encoders with very low bit rate for videotelephony in the public switched telephone network in ITU-T with a transmission rate of 5–7 kbit/s.

The standardization of moving picture encoders current in the ITU-T and ISO/IEC with very low bit rates, for example for videotelephony in the public switched telephone network in ITU-T (draft ITU-T H.26P) with the expedient transmission rate of 8–24 kbit/s.

The norming of the datafile description concluded in the ITU-T in the ITU-T T.434 "Binary file transfer for the telematic services".

The norming of still pictures with continuous gray scale values or colors concluded in the ITU-T and ISO/IEC (ITU-T T.81/ISO/IEC 10918-1) with low bit rates with the expedient transmission rate of 4–24 kbit/s.

The norming of two-color still pictures concluded in the ITU-T and ISO/IEC (ITU-T T.82/ISO/IEC 11544) with low bit rates with the expedient transmission rate of 2–24 kbit/s.

The ongoing standardization in the ITU-T and ISO/IEC of the datafile exchange format ITU-T T.84/ISO/IEC 10918-3 ("Extensions") for video communication. The still picture compression algorithms ITU-T T.81/ISO/IEC 10918-1 ("JPEG"—for continuous color images) and ITU-T T.82/ISO/IEC 11544 ("JBIG"—for bi-level still pictures) are supported.

The afore-mentioned standards need to be combined and partially expanded for realizing the present invention.

Figure 1:
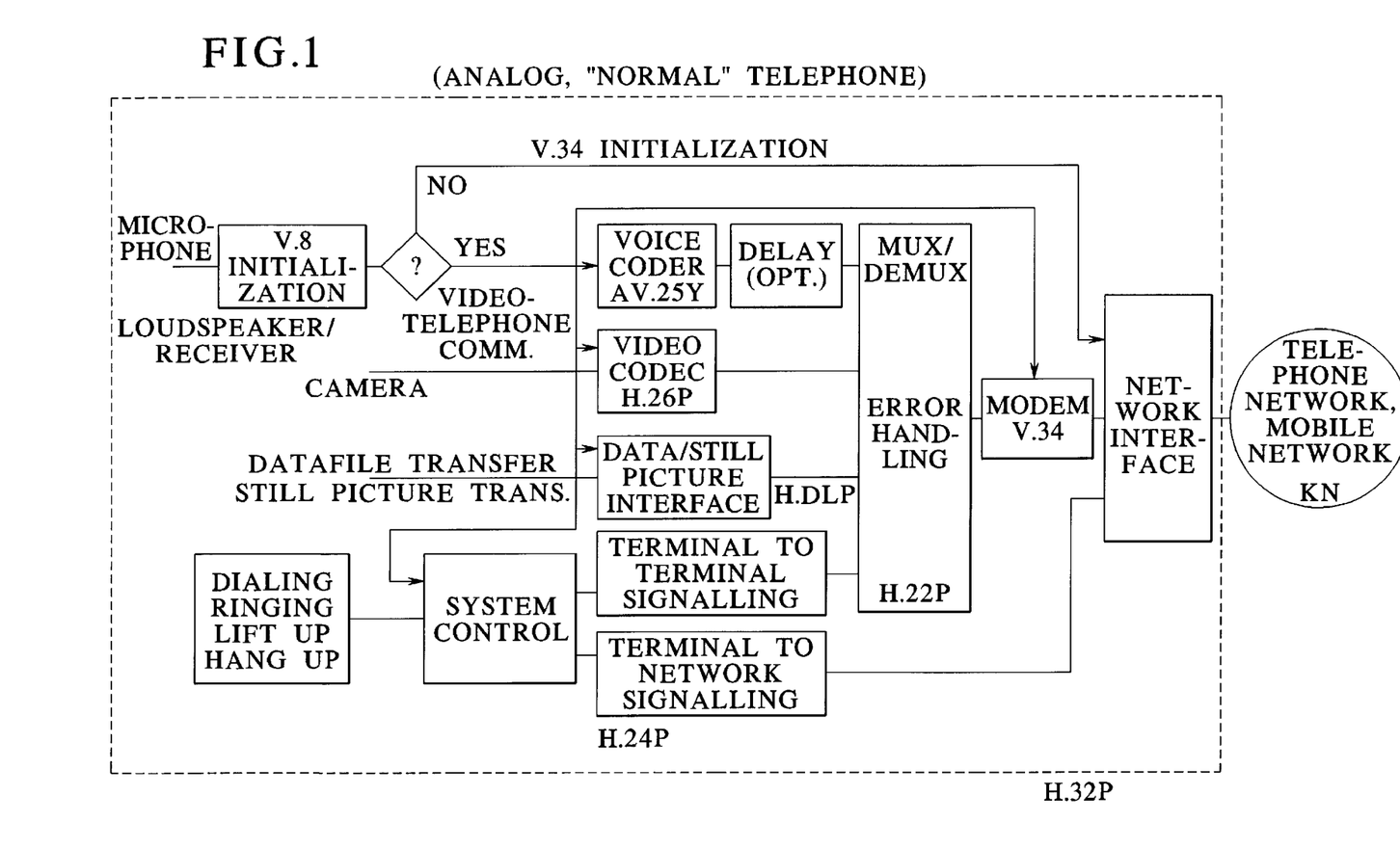
FIG. 1 is a block diagram of a videotelephone communication terminal equipment KES.

Some properties of communication terminal equipment to be provided for the realization of an inventive method are explained in greater detail below:

A typical videotelephone terminal equipment for the inventive call setup satisfies at least the features of a telephone for the public switched telephone network or of a radiotelephone and, additionally, a communication control means for controlling the data transmission with the assistance of an HDLC-LAP-conforming transmission protocol (in order to assure an error-free communication), an ITU-T V.34 modem, and a suitable ITU-T V.8 initialization protocol. Additionally, at least the transmitting communication terminal equipment (KES) should also contain an audio and a video encoding means for the compression of the audio and video input digital signal or, respectively, the receiving communication terminal equipment (KEE) and also at least an audio and video decoding means for the decompression of the received audio and video information data. FIG. 1 depicts a simplified block circuit diagram of such a videotelephone communication terminal equipment. During the connection, the videotelephone is connected either to another videotelephone or to a normal telephone.

The connection to other videotelephones or to normal telephones is either produced as connection of the videotelephones (the expansions necessary for this are yet to be standardized in the ITU-T V.8) or, if this is not possible, to normal telephones. What this means for the call setup is that the transmitting videotelephone initially attempts—immediately, i.e. without time delay—to address the called apparatus as receiving "videotelephone" (signalling with the assistance of ITU-T V.8). This is important because, according to ITU-T V.8, the network must be immediately signalled that an especially high-quality communication channel must be made available for the connection under certain circumstances (for example, given transmission by satellites) since the highest possible ITU-T V.34 rate should be supported. A V.8 signalling in the same connection after the end of a normal telephone call (for example, a switching into the videotelephone mode) with the assistance of ITU-T V.8 and ITU-T V.34 is therefore neither meaningful nor possible. When the called terminal equipment answers as "videotelephone" (likewise with the assistance of ITU-T V.8), the digital connection for the information exchange can be set up with the assistance of ITU-T V.34. If the called apparatus is, for example, a data modem or a fax device, then the connection is aborted. When the called apparatus is a normal telephone that has no ITU-T V.8 procedure available to it, then the switching to the normal "telephone mode" ensues automatically. In this case, the connection is continued as a normal "telephone call".

When, however, two videotelephones encounter one another, then the terminal equipment identifications are exchanged between transmitter and receiver according to ITU-T V.8 in order to signal that videotelephone communication is possible.

The ITU-T V.34 procedure of the modem is initiated after successful ITU-T V.8 signalling. The selection of the highest mode rate is also implemented according to rules of ITU-T V.34 after the "line probing" and "training" in the full-duplex mode (i.e. determining the line quality and testing the maximally suitable modem rate).

For the full-duplex mode, the control commands of the communication controller must be exchanged as part of the ITU-T-V.34 data transfer. To that end, a virtual "supervisory control" channel (control channel) must be defined. The data packets of this channel are specifically identified as control packets. The following are included among the control commands valid for both communication partners:

Mutual exchange of the device properties (GEREIG) of the transmitter and receiver (for example, identification of the video parameters (for example, picture screen resolution, options for still picture, datafile transfer, camera remote control, remote cursor movement capability, etc.)). Exchange of the device properties ensues once, namely at the beginning of the connection.

Communicating the preferred reception parameters (EMPFPAR) (optional—at any time)

Setting the transmission parameters (SENDPAR) (on the basis of the declared device properties of the transmitter and receiver and taking the preferences of the other party into consideration)—setting and exchange at least once, at the beginning of communication, then as often as desired at any arbitrary point in time. The setting is respectively defined by the transmitting party; the receiver can merely express his "reception wishes" (preferential wishes). When no receiver preferences are received, the transmitter sets the values that derive on the basis of the common device parameters.

Sending a still picture (SENDSTD) (optional—at any time)

Fetching a still picture (ABRSTD) (optional—at any time)

Sending a data datafile (SENDDAT) (optional—at any time)

Fetching a data datafile (ABRDAT) (optional—at any time)

Camera remote control of the partner (CAMSTR) (optional—at any time)

Cursor remote control (CURSSTR) (optional—at any time)

Normal termination of the communication (EXIT)

Abort of the communication (ABBRUCH)

Acknowledgment of the control commands (ACKNOW)

The actual communication between transmitter and receiver corresponds to the data phase of ITU-T V.34 (after successful "ITU-T V.34 Resynch"). Here, communication is carried out with the previously declared, maximum rate. An error correction mode according to HDLC LAP is required for videotelephone communication. To that end, the digitized data blocks must be generated and numbered (HDLC LAP according to Draft ITU-T H.24P). A transmission priority is assigned to each information type. Control data thereby have the highest priority and have this given full error correction. When a block was recognized as faulty, then it must either be retransmitted (if the information type must be transmitted unconditionally protected, for example in the "Supervisory Channel", still picture transmission file transfer) or the faulty block can also be ignored (for example, moving picture transmission). A detailed description of the information block types and of the appertaining priorities is set forth in Table 1.

TABLE 1

Information Types and Priorities

| Information block type | Type of priority | Default values for error correction | Default values for transmission priority |
|---|---|---|---|
| Control (Supervisory) | Fixed | Repeat block until error-free | Very high |
| Moving picture (Video) | Definable | Faulty blocks can be discarded | Moderate |
| Audio/Voice | Definable | Faulty blocks can be discarded | High |
| Still picture | Definable | Repeat block until error-free | Low |
| Datafile (file transfer) | Definable | Repeat block until error-free | Low |
| Camera remote control | Fixed | Repeat block until error-free | Very high |
| Cursor remote control | Fixed | Repeat block until error-free | Very high |

The fixed priority means that the priority cannot be changed during the course of the communication. The default priority is that priority value that was set by the system as initial value at the start of the communication. In the definable priority, the transmitter can modify these values once or repeatedly either on demand by the receiver or based on the transmitter's own decision (control command SENDPAR). The receiver's wish is announced with the communication of the preferred reception parameters (control command EMPFPAR, optional command that can be output by the receiver at any time). As reaction, the transmitter can (but need not) modify the transmission and error correction priorities. For example, the receiver can prefer a fast, error-free audio signal transmission to delayed voice-image synchronization. The transmitter can likewise modify the transmission priorities on its own initiative, for example the transmission priority of the still picture in a connection at the expense of the moving picture priority.

The correct reception of the control parameters SENDPAR and EMPFPAR is acknowledged with the control command (ACKNOW) or negatively acknowledged (NOTACK) given an error.

As a specific example: The solution of the desired audio communication (as in the case of a normal telephone) at the start of the communication and the "switching" into videotelephone communication is carried out in the following way: call setup V.8 initialization, V.34 modem initialization. After successful execution, V.34 data mode, exchange of device properties (optional preferences), both parties only send audio information to the other party at the start. In the "switching" to videotelephone mode, at least one of the communication parties begins to also embed moving picture information into the transmission data stream.

Inventive methods enable the definition and control of the optional still picture transmission. Still pictures of different types (for example, black/white and color pictures) and flexible image resolution size, and still pictures with sequential image construction (line-by-line or block-by-block from top to bottom and from left to right) and/or progressive image construction (first, an image with coarser image quality is transmitted, but fast; the image quality is improved step-by-step as the transmission continues). Miniature images (so-called icons) are likewise supported.

The optional reception possibilities of the transmitter and receiver are set after exchange of the device properties (with the control command GEREIG) of the transmitter and of the receiver. This exchange only ensues once, at the start of the connection or upon RESET given error and abort. The communication of the preferred reception parameters (with EMPFPAR) can also optionally ensue. This exchange is optional and can ensue at any time.

Setting the transmission parameters ensues with SENDPAR on the basis of the declared device properties of the transmitter and receiver and the preferences of the other party. This setting and exchange ensues at least once, at the start of the communication, as reply to the device properties and preferences (if present), can potentially ensue again an arbitrary number of times at any arbitrary point in time. The setting is respectively defined by the transmitting party; the receiver can merely express his "reception wishes" (preferential wishes). If no reception preferences are received, the transmitter sets the values that derive on the basis of the common device parameters. A determination is made in GEREIG as to whether and what kind of still picture can be supported by the receiving terminal equipment (for example, image size, possibility of sequential and of progressive image construction, support of ITU-T T.81/ISO/IEC 10918-1 ("JPEG") and/or ITU-T T.82/ISO/IEC 11544 ("JBIG"). The transmission of a still picture is optionally initiated at any time with the command (SENDSTD) or ABRDAT (fetch a still picture offered by the other party).

Subsequently, standard image data blocks are mixed with the other data types and transmitted—with the specified or default priority. Alternatively, the fetching of a still picture from the other party is likewise optionally possible at any time (with the control instruction ABRSTD). In the transmission, the image data are embedded in a data stream that was specified according to ITU-T T.84/ISO/IEC 10918-3. All datafiles defined in this way contain all important information with respect to the image to be transmitted (for example, image resolution, image dimension, type of image construction, etc.). The type of display of the received image lies at the discretion of the receiver. The successful execution is acknowledged with the acknowledge instruction (with the command ACKNOW) or a negative acknowledgment (NOTACK) is communicated (for example, when the image cannot be decoded).

Given the control command "transmission of datafiles" (file transfer), the exchange of device properties, preferences and settings of the parameters ensues as described above in the transmission of still pictures. Only the commands for the transmission of a datafile (SENDDAT) deviate therefrom. This command is optional and can be output at any time. The successful execution is acknowledged with the acknowledge instruction, the and ACKNOW. Otherwise, a negative acknowledgment (NOTACK) is communicated, for example when the image cannot be decoded.

Subsequently, datafiles shaped according to ITU-T T.434 in specifically identified data blocks are mixed into the data stream of the videotelephone data blocks.

The fetching of a datafile is achieved with the control instruction (command) (ABRDAT). This instruction is likewise optional and can be output at any time. The successful execution is acknowledged with the acknowledge instruction (ACKNOW) or a negative acknowledgment (NOTACK) is communicated.

Subsequently, datafiles shaped according to ITU-T T.434 in specifically identified data blocks are mixed into the data stream of the videotelephone data blocks.

A cursor remote control (CURSSTR) can also be optionally output at any time by the transmitting party. The successful execution is acknowledged with the acknowledge instruction (ACKNOW) or a negative acknowledgment (NOTACK) is communicated.

The instruction "Normal Termination" of the communication (EXIT) leads to the proper termination of the communication. The devices are placed into their basic condition. This instruction must be acknowledged with an acknowledgment instruction (ACKNOWL) of the other party. The end of the communication can only be ended then.

An instruction "Abort the Communication" (ABBRUCH) can, if provided, lead to the fast abort of the communication. This instructions is usually output after an error in order to achieve a proper termination of the terminal equipment and to abort the communication. It is beneficial but not absolutely necessary that this instruction be answered with the acknowledgment instruction (ACKNOWL). The instruction "Abort with RESET" has a similar function, but with the difference that the communication is not aborted, rather all parameters are reset to their initial stage in order to enable a renewed communication.

Further, an exemplary embodiment is proposed for the ITU-T V.8 and ITU-T V.34 parameterization upon insertion of expansions. The V.8bis initialization procedure is similar.

Figure 2:
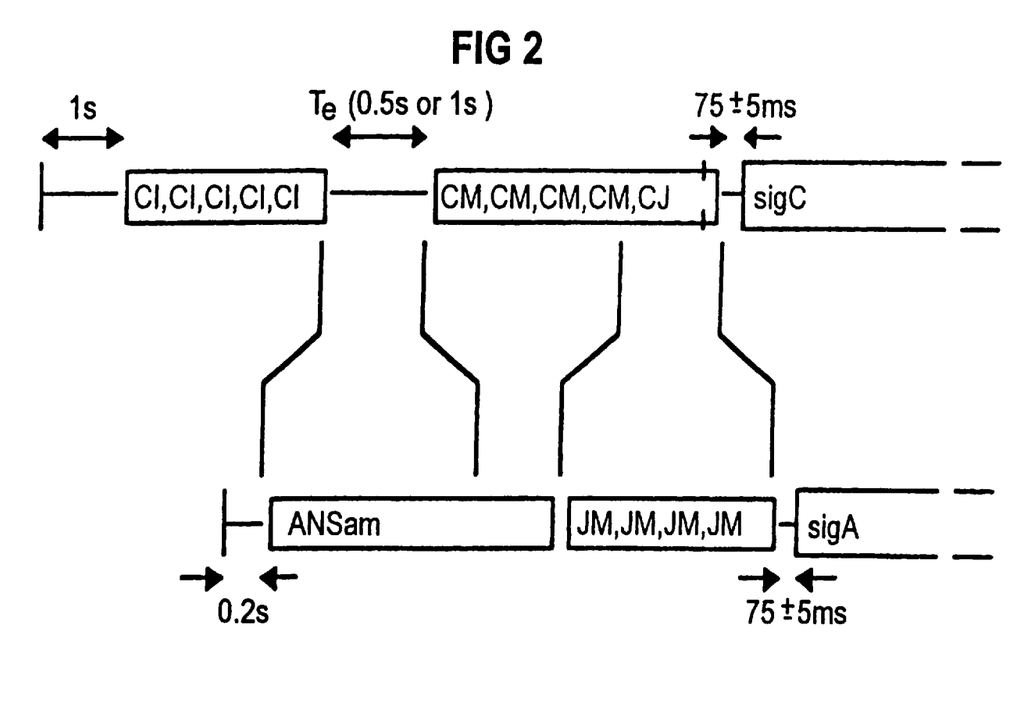
FIG. 2 depicts the application of the CI signal and the exchange of the CM/CL menu in the framework of the ITU-T V.8 initialization procedure.

FIG. 2 illustrates the V.8 "Start up" procedure of the session initialization. This is absolutely necessary in the context of a V.34 modem. The V.8 "Start up" procedure is active once, at the start of the communication connection.

As can be seen from FIG. 2, the delay after connection through-connect amounts to about 1 second at the side of the calling terminal equipment (DCE) in a connection according to V.8 (and, subsequently, V.34). Thereafter, the CI signals (CI=call identifier) are transmitted with 300 b/s until the called terminal equipment (DCE) does not reply with an ANSam signal ("Answer tone signal" of V.8). Subsequently, the calling DCE sends the signals Cms ("Call Menu" signals with the selection of what are referred to as the "call Function" categories—for example, "Voice Memory Telephone", with the selection of the modem modulation— for example, for V.34 full-duplex, with the selection of the protocol category—LAP "?"). With its "JM" signals, the called DCE reflects the same type of information in order to declare its device properties. A determination is made on the basis of the two tables as to whether communication is possible between the two parties. If yes, then the V.34 procedure usually follows within 2 seconds.

When the called DCE is not a "Voice Memory Telephone" but, for example, a normal telephone, then the V.8 procedure is aborted with the expiration of a specific time span (timer). This time span is not specified in the V.8 but in the application of the "Voice Memory Telephone".

The CM/JM code allocations of the "Voice Memory Telephone" are lacking in the current version of ITU-T V.8. (See FIG. 3.) These allocations are undertaken by the ITU on demand. An example of how they could be undertaken is recited below.

Figure 3:
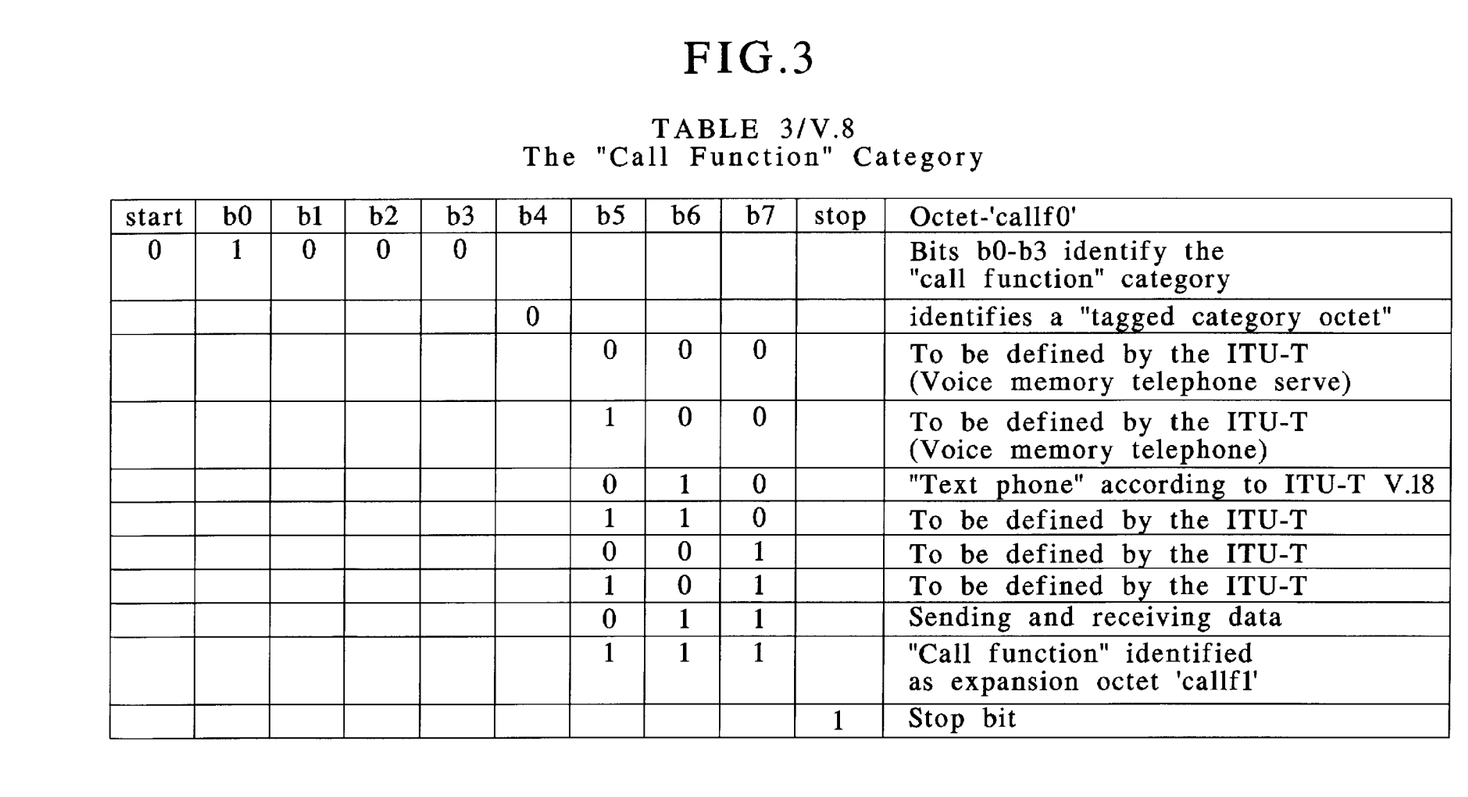
FIG. 3 is the table 3/V.8 of the "Call Function" category of an exemplary embodiment of the expanded ITU-T V.8 initialization procedure.
Figure 4:
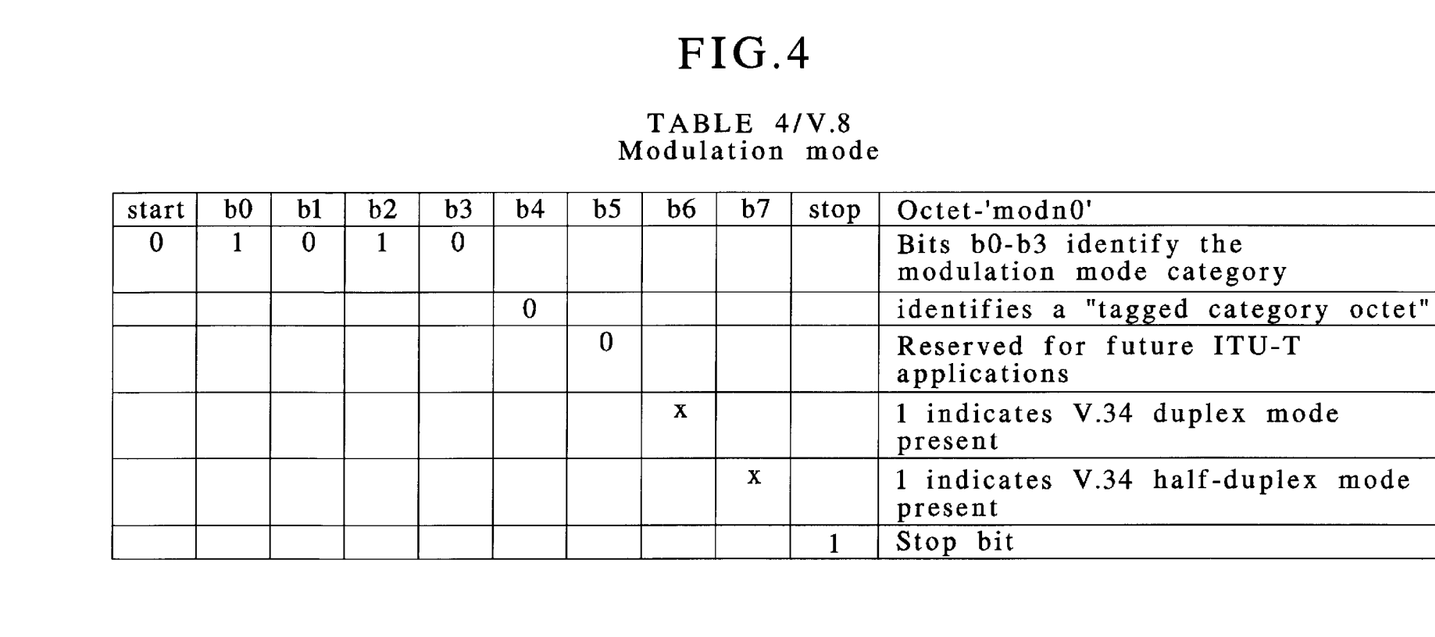
FIG. 4 is the table 4/V.8 of the "Modulations Modi" category of the expanded ITU-T V.8 initialization procedure.

The Table 3/V.8 specifies the "Call Function" category of V.8. The ITU has already reserved some code points in the first octet. Two code points should be reserved for the "Voice Memory Telephone". The illustrated code points were occupied by way of example. The modulations modi are specified in the Table 4/V.8 (see FIG. 4).

Figure 5:
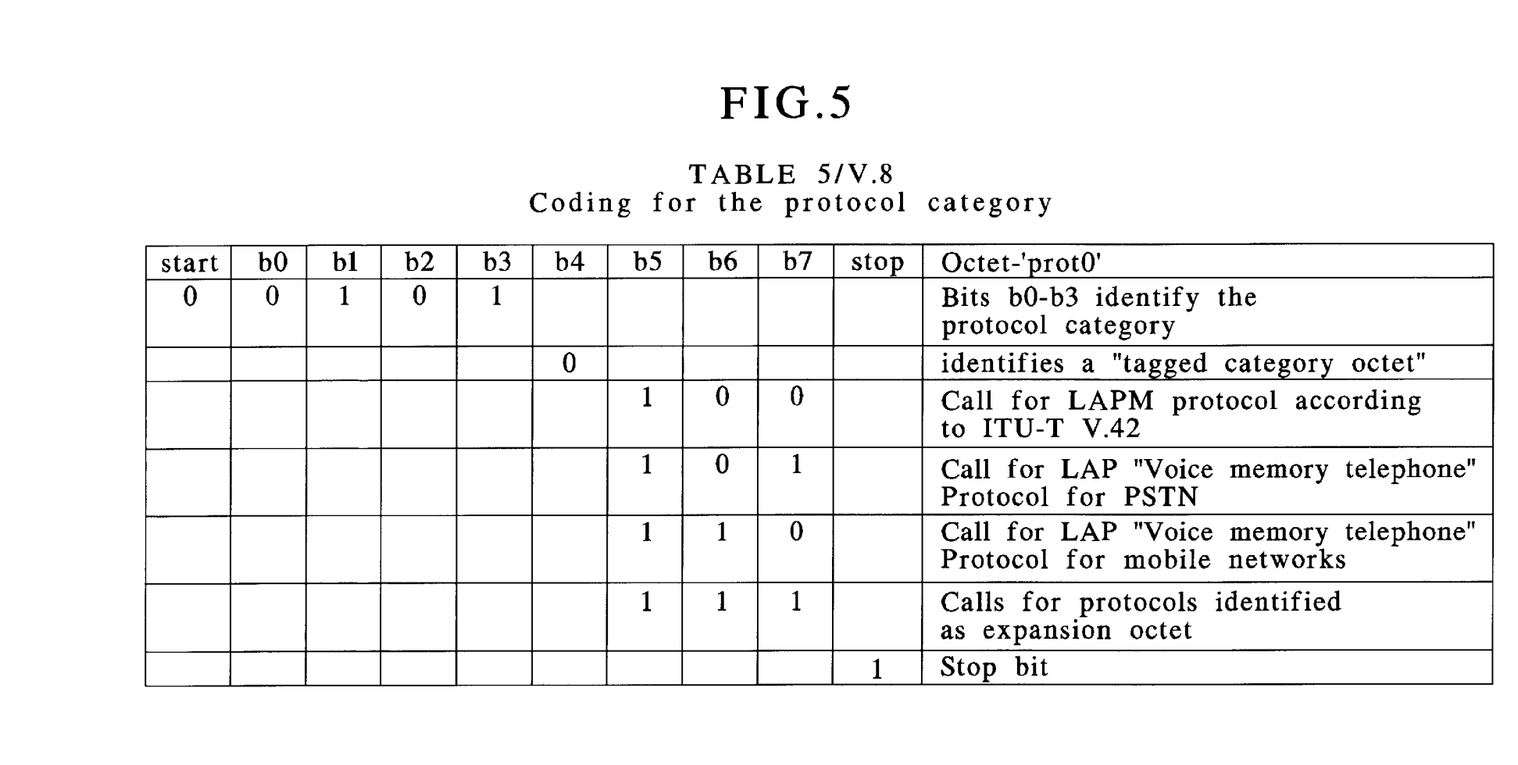
FIG. 5 is the table 5/V.8 of the encoding of the protocol category of the expanded ITU-T V.8 initialization procedure.

The octet for possible "protocols" can also be left out in case only one protocol is specified for the "Voice Memory Telephone" service. If a plurality of protocols are to be employed, for example for different network types (PSTN, mobile), then this octet is used and corresponding code points are specified for the protocol types.

The GSTN access category is defined in Table 6/V.8 (not shown). It indicates whether the calling or the called terminal equipment is connected via the mobile radiotelephone network.

The exchange of additional information is not provided by ITU-T V.8 since V.8 is too slow (300 b/s) for the exchange of larger information. All additional negotiations or, respectively, control commands should therefore run via the procedures of the ITU-T V.34 modem.

A V.34 "start-up" also sequences after the successful execution of the V.8 "start-up". This comprises:

V.34 "Line Probing" (estimate of line quality)
V.34 HDX (half-duplex) or FDX (full-duplex) "training"
V.34 parameter exchange
V.34 resynchronization.

Only after this does V.34 change to its data transfer mode where the actual user data are exchanged.

What is referred to as a "retrain" (retraining) of V.34 is executed if the line quality during the data communication is in fact inadequate. The data transfer is interrupted and a new transmission rate with adequate quality is set by "retrain". The transmission of the data is then continued. No isochronic transmission of the user data (for example, audio information) can ensue during the "retrain" in the current version of V.34.

The ITU-T V.34 procedure of the modem is initiated after successful ITU-T V.8 signalling. The selection of the highest modem rate is also implemented according to rules of ITU-T V.34 after the "line probing" and "training" in full of half duplex mode (i.e. determination of the line quality and testing the maximally suitable modem rate). Subsequently, the V.34 parameters are exchanged again according to ITU-T V.34 (only for the half-duplex mode) and the control commands needed for the communication are exchanged with 1200 bit/s. The control commands must be exchanged for the full-duplex mode. The control commands must be exchanged as part of the data transfer for the full-duplex mode. To that end, a virtual "supervisory control" channel must be defined. The data packets of this channel are specifically identified. At least the following are valid as control commands:

Exchange of additional device properties of the transmitter and receiver such as, for example, identifier of the audio/voice compression, mailbox capability, half/full-duplex capability, communication of the receiver preferences;

Setting the common, preferred transmission or reception parameters on the basis of the declared device properties of the transmitter and receiver; opening and shooting [sic] virtual user channel (for example, for audio).

Sending a message;

Fetching a message;

Addressing a voice mailbox;

Normal termination of the communication;

Abort of the communication.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for connection setup between videotelephone communication terminal equipment in a transmission network using a protected transmission protocol in a framework of ITU-T V.8 initialization and of an ITU-T V.34 modem, comprising the steps of:

supporting videotelephone communication within the framework of the ITU-T V.8 initialization in that at least a request for high transmission quality for videotelephone communication is signalled to the network during connection setup between a calling terminal equipment and a called terminal equipment; and recognizing in the calling terminal equipment a type of the called terminal equipment and a type of the transmission network connected thereto.

2. A method for control of videotelephone communication between videotelephone communication terminal equipment in a virtual control channel within a framework of an ITU-T V.34 information transfer, comprising the steps of:

providing a virtual control channel with HDLC LAP protected transmission of control data blocks in bidirectional full-duplex mode;

providing control instructions for effecting videotelephone communication between the videotelephone communication terminal equipment, the control instructions being set forth in the following Table:

| Control instruction | Function | Action time | Number of actions | Control reactions |
|---|---|---|---|---|
| GEREIG (prescribed) | Exchange of device properties; GEREIG is simultaneously sent by both parties | Immediately after setup of the virtual control channel | Once | ACKNOW or NOTACK with potentially following SENDPAR |
| EMPFPAR (optional) | Parameters of the desired reception preferences. Can be independently requested by one or both parties. | After exchange of the GEREIG | Arbitrary | ACKNOW or NOTACK |
| SENDPAR (prescribed) | Setting the transmission parameters on the basis of received GEREIG and EMPFPAR | Immediately after reception and acknow-ledge of GEREIS of the other party | At least once | ACKNOW or NOTACK |
| SENDSTD (optional) | Send still picture. Image datafile and image parameters embedded in ITU-T T.84 / ISO/IEC 10918-3 data stream | Any time if the option is permitted at the receiver (GEREIS) | Arbitrary | ACKNOW or NOTACK |
| ABRSTD (optional) | Fetch still picture. Image datafile and image parameters embedded in ITU-T T.84 / ISO/IEC 10918-3 data stream | Any time if the option is permitted at the transmitter and receiver | Arbitrary | ACKNOW or NOTACK |
| SENDDAT (optional) | Send datafile. Datafile and datafile parameters embedded in ITU-T T.434 data stream | Any time if the option is permitted at the receiver (GEREIS) | Arbitrary | ACKNOW or NOTACK |
| ABRDAT (optional) | Fetch datafile. Datafile and datafile parameters embedded in ITU-T T.434 data stream | Any time if the option is permitted at the transmitter and receiver | Arbitrary | ACKNOW or NOTACK |

-continued

| Control instruction | Function | Action point in time | Number of actions | Control reactions |
|---|---|---|---|---|
| CAMSTR (optional) | Remote control (pan, zoom, etc.) of the camera of the other party | Any time if the option is available at the transmitter and permitted at the receiver (GEREIS, EMPFPAR) | Arbitrary | ACKNOW NOTACK |
| CURSSTR (optional) | Cursor remote control. Moving a cursor in the image surface of the other party | Any time if the option is available at the transmitter and permitted at the receiver (GEREIS, EMPFPAR) | Arbitrary | ACKNOW or NOTACK |
| EXIT (prescribed) | Proper termination of the communication | Can be initiated from both sides | Once | ACKNOW or NOTACK |
| ABORT (prescribed) | Abort in case of error -- end of the communication | Can be initiated from both sides | Once | ACKNOW or NOTACK |

| Control instruction | Function | Action point in time | Number of actions | Control reactions |
|---|---|---|---|---|
| ABORT with RESET (prescribed) | Abort in case of error -- maintain the communication, reset all default parameters | Can be initiated from both sides | Arbitrary | ACKNOW or NOTACK with subsequent GEREIG |
| ACKNOW (prescribed) | Positive acknowledgment of a control instruction | Control receiver | Once | None |
| NOTACK (prescribed) | Negative acknowledgment of a control instruction | Control receiver | Arbitrary | New control instruction |

3. The method according to claim 2, wherein, for controlling different information types, a virtual channel is allocated to each of the information types using an HDLC LAP method, and wherein one of fixed or freely definable transmission priorities and/or error correction priorities are allocated to various data types, whereby preset normal parameters are employed at a beginning of communication instead of freely definable priorities, said normal parameters being redefinable during the communication using the control instructions EMPFPAR and SENDPAR.

4. The method according to claim 2, wherein image datafiles are embedded in ITU-T T.84/ISO/IEC 10918-3 datafile formats;
   wherein parameters of the image datafiles are embedded in the ITU-T T.84/ISO/IEC 10918-3;
   wherein continuous color images according to ITU-T T.81/ISO/IEC 10918-1 with variable image size with sequential or progressive image construction are supported;
   wherein continuous color images according to ITU-T T.81/ISO/IEC 10918-1 with variable image size are supported;
   wherein bi-level images according to ITU-T T.82/ISO/IEC ii544 with variable image size with sequential or progressive image construction are supported;
   wherein preparations for transmission are negotiated and set with the control instructions GEREIG, EMPFAR and SENDPAR; and
   wherein control of still picture transmission ensues with the control instructions SENDSTD and ABRSTD, and reception of the control instructions SENDSTD and ABRSTD is acknowledged with control instruction ACKNOW or negatively acknowledged with control instruction NOTACK in case of error.

5. The method according to claim 2, wherein arbitrary program or data datafiles are defined according to ITU-T T.434;
   wherein preparation for transmission of arbitrary program or data files are negotiated and set with the control instructions GEREIG, EMPFAR and SENDPAR;
   control of datafile transmission ensues with the control instructions SENDDAT and ABRDAT, and reception of the control instructions SENDAT and ABRSDAT is acknowledged with control instructions ACKNOW or is negatively acknowledged with control instructions NOTACK in case of error.

6. The method according to claim 2, wherein regarding remote control of a camera preparations for transmission are negotiated and set with the control instructions GEREIG, EMPFAR and SENDPAR;
   control of datafile transmission ensues with the control instruction CAMSTR, and wherein reception of the control instruction CAMSTR is acknowledged with control instruction ACKNOW or is negatively acknowledged with control instruction NOTACK in case of error.

7. The method according to claim 2, wherein remote control of a cursor ensues with the control instruction CURSSTR, and wherein reception of the control instruction CURSSTR is acknowledged with control instruction ACKNOW or is negatively acknowledged with control instruction NOTACK in case of error, and wherein preparation for transmission is negotiated and set with the control instructions GEREIG, EMPFAR and SENDPAR.

* * * * *